July 5, 1932. E. S. HUME 1,865,692
APPARATUS FOR THE MANUFACTURE OR LINING OF PIPES BY CENTRIFUGAL ACTION
Filed July 17, 1928
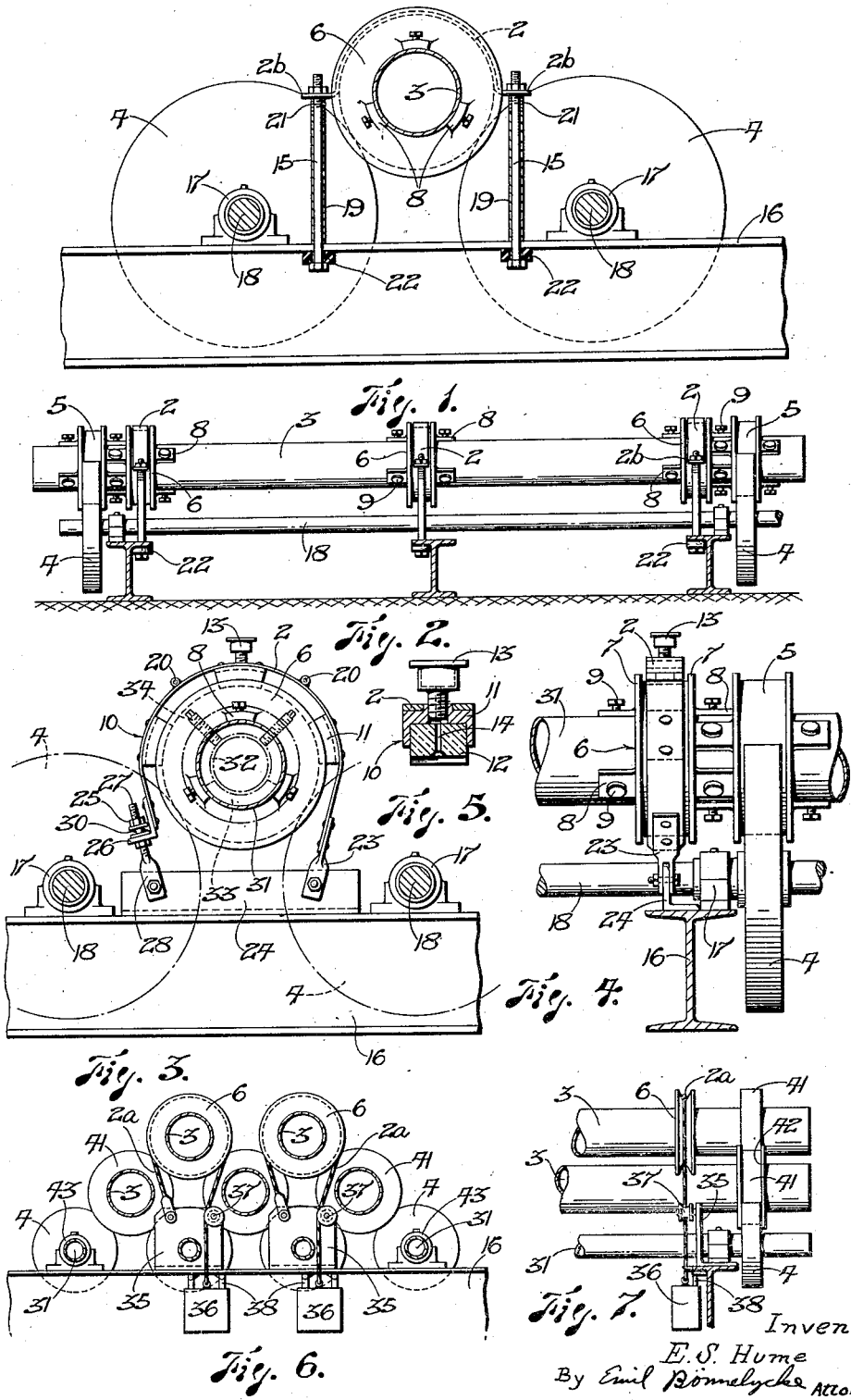
Inventor:
E. S. Hume
By Emil Bonnelycke Attorney Patented July 5, 1932

1,865,692

UNITED STATES PATENT OFFICE

EDWARD SHOTTON HUME, OF PERTH, WESTERN AUSTRALIA, AUSTRALIA

APPARATUS FOR THE MANUFACTURE OR LINING OF PIPES BY CENTRIFUGAL ACTION

Application filed July 17, 1928, Serial No. 293,335, and in Australia January 10, 1928.

This invention relates to the manufacture or lining of pipes by centrifugal action, and is particularly applicable in instances where a mould, in which concrete pipe is to be formed, or a metal pipe, or an outer casing containing a metal pipe, to be lined with concrete or the like, rests upon and is driven by frictional contact with combined supporting and driving wheels or members.

In pipe forming or lining operations of the kind indicated there is a tendency for the mould pipe or pipe casing to jump up and down in relation to its supporting and driving wheels especially when rotating at a speed sufficiently high to obtain effective moulding and consolidation of the concrete. Such jumping of the mould, pipe or casing seriously impairs the centrifugal moulding action and is liable to render the concrete pipe or pipe lining of irregular density and thickness. Moreover the apparatus is subjected to shocks and strains by the jumping of the mould, pipe or casing.

The primary object of this invention is to provide simple and efficient means for eliminating any jumping of a mould, pipe or pipe casing, during rotation thereof. The invention ensures that the mould, pipe or casing, is maintained in engagement with its driving and supporting wheels irrespective of the speed of rotation, and thus ensures a highly satisfactory centrifugal action and the production of concrete pipes or pipe linings of uniform density and thickness throughout.

In its preferred form the invention contemplates a holding down element preferably in the form of a substantially semi-circular or arcuate strap or band which is adapted to extend around the upper arc or portion of a mould, pipe or pipe casing, and is suitably retained in position to thereby exercise a holding down or steadying influence upon the rotating mould, pipe or casing. The holding down element preferably bears comparatively lightly or gently upon the mould, pipe or casing so that only a minimum of friction occurs between the parts.

The invention also contemplates simple and effective means for operatively applying such holding down elements whereby they may be conveniently utilized to the best advantage.

Referring to the drawing which forms part of this specification:—

Figure 1 is a cross section showing a holding down device in accordance with one embodiment of this invention applied to pipe forming or lining apparatus.

Figure 2 is a side elevation on a reduced scale of pipe forming or lining apparatus incorporating a plurality of holding down devices as seen in Figure 1.

Figure 3 is a cross section of pipe forming or lining apparatus incorporating a modified form of holding down device.

Figure 4 is a fragmentary side elevation of the parts indicated in Figure 3.

Figure 5 is a detail view of the holding down device seen in Figures 3 and 4.

Figure 6 shows in end elevation and Figure 7 shows in side elevation, holding down devices according to another embodiment applied to pipe forming or lining apparatus.

A holding down element in accordance with this invention may comprise an arcuate or approximately semi-circular band 2 (Figures 1 to 5) of steel, brass or any other suitable material or combination of materials, or a rope 2a (Figures 6 and 7) adapted to extend around the upper portion of a mould, pipe or pipe casing in which the centrifugal action is to take place. Two at least of the holding down elements are preferably employed and are preferably arranged between pairs of supporting and driving wheels 4 upon which runner wheels 5, applied to the mould 3, or a pipe or pipe casing, rest at each end as indicated in Figure 2.

The holding down elements may be directly associated with the mould, pipe or pipe casing but preferably to co-act with rings or collars 6 which are provided at their sides with outstanding flanges 7 and extend around the exterior of the mould, pipe or pipe casing as will be hereinafter referred to. The said flanged collars 6 may be provided at each side with lugs 8 whereby they may be detachably fastened by screws 9 or the like to the mould, pipe or casing so as to rotate therewith.

Each holding down element 2 may contact directly with the outer peripheral surface of a collar 6 between the flanges 7 thereof as seen in Figures 1 and 2, but it may be more advantageous for the holding down element to be spaced clear thereof and be fitted at desired intervals with suitable anti-friction members 10 (Figures 3, 4 and 5) which contact with the collar 6 around the mould, pipe or pipe casing. There may be any desired number of such anti-friction members for each element, and they may comprise bearing blocks attached to the element 2 by bolts, countersunk screws, rivets or other suitable means so that they may be renewed in the event of wear. If desired, the anti-friction devices may comprise cast iron or other suitable boxes or holders 11 filled with suitable bearing material 12, the boxes being open at their inner faces, as seen in Figure 5.

Provision may be made for lubricating the contacting surfaces of the holding down bands 2 and the collars 6 on the mould, pipe or casing and, according to one construction, a lubricator 13 may be applied to each band and a duct 14 may extend therefrom through one of the bearing blocks 12, preferably a bearing block disposed at or adjacent the crown of the curved band 2.

The flanges 7 of the collars 6 prevent undue side play of the holding down bands 2, and, by forming said collars with smooth surfaces and providing for lubrication thereof, friction between the bands or the bearing blocks 12, and the collars is reduced to a minimum.

In order to retain each holding down element in position its end or side portions 2b may be turned outwardly as in Figures 1 and 2 and provided with apertures or slots to accommodate the respective end portions of retaining bolts 15. One of such bolts may be provided at each side of the band and preferably extend vertically, the lower end portions thereof passing through a joist 16 or suitable frame work which may carry bearings 17 supporting the shafts 18 carrying the combined supporting and driving wheels 4 for the mould, pipe or casing to be rotated.

If desired, the retaining bolts may each be encircled by a tubular spacing member 19 and a series of washers 21 may encircle the bolts between one end of the spacer 19 and the outturned portion of the holding down band, to permit of adjustment of the latter to thereby reduce friction between the band 2 or bearing blocks 11 thereon, and the collars 6; compensate for any wear of the band or its bearing blocks; and enable the band to be adjusted for employment with moulds, pipes or pipe casings of different diameters. To impart flexibility or additional flexibility to the holding down bands they may be formed in longitudinal sections hingeably connected to each other, preferably at points between adjacent bearing blocks 11, as indicated at 20 in Figure 3.

Rubber buffers 22 or, if desired, springs, may also be associated with the retaining bolts 14 where they pass through the joists 16 to provide a slight degree of resiliency which prevents excessive friction between the holding down devices and the mould, pipe or pipe casing.

Another form of retaining means for the holding down element or band 2 is shown in Figures 3 and 4, wherein one end portion of the band is attached to a yoke 23 pivoted to a frame member 24, while the other end portion has an apertured extension 26 which may be held by nuts 25 in various adjusted positions to a screw stem 27 of a second yoke member 28 pivoted to the frame 24. A rubber buffer or a spring washer 30 may encircle the stem 27. In Figures 3 and 4, the flanged collar 6 is shown applied to a casing 31 provided with means for holding a pipe 32 to be lined, in a concentric position therein so that the pipe rotates with the casing. Such pipe holding means may comprise, for example, self-centering liners or cradles 33 fitted within the casing 31 at desired positions, and screws 34 for holding the pipe firmly upon said liners. Such pipe holding means may, however, vary in construction and form no part of the present invention.

If desired, each holding down band may be in the form of a rope or cable 2a, as indicated in Figures 6 and 7, and adapted to extend around an appropriately shaped collar 6 on the mould, pipe or pipe casing. The rope 2a may contact with the collar 6 as shown or it may be provided with anti-friction devices similar to those designated by the numeral 10 in Figures 3, 4 and 5. To retain the holding down rope in position and to place the desired tension thereon, one end of each rope may be suitably connected to a frame member 35, and the other end may have a weight 36 attached. The rope may be guided by a pulley or idle roller 37 and stops 38 may be provided to limit upward movement of the weight during the rotation of the mould, pipe or pipe casing. Cam, eccentric or any other suitable means may be provided to raise the weight at the completion of pipe forming or lining operations.

It is to be understood however, that various other means may be utilized to retain the holding down elements, whether in the form of bands or ropes, in operative positions and to place the desired tension thereon.

In Figures 6 and 7, the holding down elements are shown applied to the upper tier of superposed tiers of moulds 3, all of which may be rotated simultaneously by frictional contact with one another and for this purpose may be fitted with interengaging runners 41, some of which may be flanged as at 42. The drive may be imparted to the moulds by supporting and driving wheels 4 mounted upon comparatively small casings 31 adapted to contain pipes to be lined. One or more of these lower casings, which may be in the form of hollow shafts, may be rotated by any suitable means and supported by bearings 43. In such an application, it will be evident that by applying holding down elements to the upper moulds, all of the moulds in the superposed tiers are prevented from jumping and are maintained in driving contact with each other.

If a relatively long length of pipe is to be formed or lined, it may be desirable to provide one or more additional holding down elements and co-acting flanged collars 6 at a point or points equally spaced from the end devices along the length of the mould, pipe or pipe casing as indicated in Figure 2.

With the present invention moulds, pipes or pipe casings of any diameter or length, according to the size of the pipe to be formed or lined, may be rotated at relatively high speed without fear of them jumping, so that a satisfactory centrifugal action is obtained which ensures pipes or pipe linings of maximum and uniform density and thickness throughout their length. The invention also enables pipe forming or lining operations to be carried out speedily, efficiently and economically and with a minimum of wear and deterioration of the apparatus.

Having now described my invention what I claim as new and desire to secure by Letters Patent is:—

1. In apparatus for manufacturing or lining pipes by centrifugal action, wherein a mould, a pipe, or a casing containing a pipe, rests upon and is rotated by frictional contact with combined supporting and driving members, the combination with said supporting and driving members of a holding down element in the form of a band adapted to extend freely around the mould, pipe, or pipe casing, and provided with anti-friction devices adapted to contact with the upper arc of the rotating mould, pipe or pipe casing, and means for retaining said holding down element in such position whereby it exercises a steadying influence on the rotating mould, pipe, or pipe casing, and maintains same in contact with said supporting and driving members.

2. In apparatus for manufacturing or lining pipes by centrifugal action wherein a mould, a pipe, or a casing containing a pipe, is adapted to rest upon and be driven by frictional contact with combined supporting and driving members, a collar extending around the exterior of the mould, pipe, or pipe casing, said collar having circumferential flanges one at each side thereof, a flexible holding down band adapted to extend freely around said collar, anti-friction devices on said band adapted to contact with the upper arc of said collar between its side flanges, and means for retaining said holding down band in position, whereby it exercises a steadying influence on the rotating mould, pipe, or pipe casing, for the purpose specified.

3. In apparatus of the kind indicated, the combination of a mould, pipe or pipe casing adapted to be supported and rotated in a horizontal attitude by pairs of supporting and driving members, one or more collars extending around the exterior of the mould pipe or pipe casing, so as to rotate therewith a flexible holding down band adapted to extend around the upper portions of each collar, and adjustable retaining means associated with the end of each holding down band to retain same in contact with the peripheral surface of said collar, for the purpose specified.

4. In apparatus of the kind indicated, the combination of a mould, pipe, or pipe casing, adapted to be supported and rotated in a horizontal attitude by pairs of supporting and driving members, one or more collars adapted to extend around the exterior of the mould, pipe, or pipe casing so as to rotate therewith, each of said collars having side flanges between which the circumferential bearing surface is provided, a holding down band, adapted to extend freely around the upper arc of each collar, bearing members carried by said band adapted to contact with the bearing surface of said collar between the side flanges and means for retaining each holding down band in position, for the purposes specified.

In testimony whereof I affix my signature.

EDWARD SHOTTON HUME.